United States Patent
Arye (10) Patent No.: US 8,284,692 B2
(45) Date of Patent: Oct. 9, 2012

(54) METHOD AND SYSTEM FOR IDENTIFYING UDP COMMUNICATIONS

(75) Inventor: Ram Arye, Rishon Lezion (IL)

(73) Assignee: Celtro Ltd, Petach Tikva (IL)

( * ) Notice: Subject to any disclaimer, the term of this patent is extended or adjusted under 35 U.S.C. 154(b) by 339 days.

(21) Appl. No.: 12/670,978

(22) PCT Filed: Jul. 24, 2008

(86) PCT No.: PCT/IL2008/001023
§ 371 (c)(1),
(2), (4) Date: Jan. 27, 2010

(87) PCT Pub. No.: WO2009/016618
PCT Pub. Date: Feb. 5, 2009

(65) Prior Publication Data
US 2010/0142397 A1 Jun. 10, 2010

Related U.S. Application Data

(60) Provisional application No. 60/953,500, filed on Aug. 2, 2007.

(51) Int. Cl.
*G01R 31/08* (2006.01)
*G06F 11/00* (2006.01)
*G08C 15/00* (2006.01)
*H04J 1/16* (2006.01)
*H04J 3/14* (2006.01)
*H04L 1/00* (2006.01)
*H04L 12/26* (2006.01)

(52) U.S. Cl. ........ 370/252; 370/232; 370/234; 370/237; 370/253; 370/255

(58) Field of Classification Search .................. 370/229, 370/231–235, 237, 252, 253, 255, 395.52
See application file for complete search history.

(56) References Cited

U.S. PATENT DOCUMENTS

| 6,286,052 | B1 | 9/2001 | McCloghrie et al. | |
| 6,754,228 | B1 * | 6/2004 | Ludwig | 370/468 |
| 6,757,255 | B1 | 6/2004 | Aoki et al. | |
| 7,046,680 | B1 * | 5/2006 | McDysan et al. | 370/396 |
| 7,142,512 | B1 * | 11/2006 | Kobayashi et al. | 370/232 |
| 7,751,433 | B2 * | 7/2010 | Dollo et al. | 370/466 |
| 2004/0083299 | A1 * | 4/2004 | Dietz et al. | 709/230 |
| 2008/0037440 | A1 * | 2/2008 | Politowicz | 370/253 |
| 2008/0144663 | A1 * | 6/2008 | Johnson et al. | 370/469 |

* cited by examiner

*Primary Examiner* — Michael Thier
*Assistant Examiner* — Benjamin H Elliot, IV
(74) *Attorney, Agent, or Firm* — Smith Risley Tempel Santos LLC; Gregory Scott Smith (57) ABSTRACT

The allocation of network resources, such as bandwidth, etc., can be dynamically adjusted based on the knowledge of the traffic volume, the transport protocol used by the payload and entitled level of services. The type of transport protocol can be determined by monitoring and analyzing characteristics of the data traffic. The frames or packets over a particular channel are monitored to identify the time between frames for a particular period of time. This time then can be used to calculate a recent average time. The timing of subsequently received frames can then be compared to this average to determine if the transport protocol is UDP, TCP or some other protocol. In other embodiments a recent average throughput can be calculated and be compared to a current throughput. This information, along with the load and entitled level of service is used to control the network resources.

13 Claims, 4 Drawing Sheets

METHOD AND SYSTEM FOR IDENTIFYING UDP COMMUNICATIONS

CROSS-REFERENCE TO RELATED APPLICATIONS

This application is a non-provisional patent application filed under 35 U.S.C. 371 and claiming priority to and the benefit of United States Provisional Application for Patent 60/953,500 filed on Aug. 2, 2007, through International Application PCT/IL2008/001023 filed on Jul. 24, 2008, of which both applications are hereby incorporated by reference.

BACKGROUND

The present invention relates to communication networks, and more particularly to communication networks that carry data and media in different communication protocols between a plurality of users over one or more communication lines between two nodes over the network.

The rapid evolution of communication networks including wireless communication networks for mobile communications, such as but not limited to, Global System for Mobile communications (GSM) networks, 3G networks, etc. creates loads over existing networks. A common communication session may be composed of several types of data (media): voice, video, computer data, signaling, etc. In addition, a single connection between two points (e.g. a source and a destination of a session) may be conducted over several types of networks: PSTN, TDMA, FDMA, ATM, IP, CDMA, cellular networks (1G or 2G or 3G), microwave links, etc. In addition to the versatility that is mentioned above, a certain type of data may further be compressed or encrypted. The result of the above complexity is that a single communication connection between two points on the network may be based on a plurality of network standards and communication protocols, compression standards, and encryption methods.

One common topology between a central location and a plurality of users can have a shape of a tree. In such architecture, a central point may be connected to one or more intermediate nodes, each intermediate node may be connected to one or more other intermediate nodes and or to one or more end-user devices (terminals). For example, in a 2G cellular network, a central node can be a BSC (base station controller) and an intermediate node can be a BTS a base transceiver stations (BTSs). In a 3G network a central node can be a Radio Network Controller (RNC) and an intermediate node can be a node base station (Nb), for example. Another common topology can have a shape of a ring in which a central point (RNC or BSC, for example) and an intermediate node (BTS or Nb, for example) are connected to the ring. Exemplary terminals can be a cellular phone, a PDA with cellular capabilities, or any other computerized device that can generate and/or receive audio, video, data or any combination of those via a communication network, such as but not limited to, a cellular network.

Usually a communication line between a central point and an intermediate node or between two intermediates nodes can carry a plurality of communication sessions between one or more other intermediate nodes and/or one or more terminals. Different types of networks and protocols can be used over the communication line. The communication line can be based on Time Division Multiplexing Access (TDMA), Code Division Multiple Access (CDMA), Addressing Time Multiplexing (ATM), Ethernet, etc. Each communication line can be divided into a plurality of channels. Each channel can be dedicated to a single connection between two terminals. There are some communication protocols in which a channel can be divided into two or more sub-channels. Each sub-channel can be dedicated to a single connection (session). Usually the data transportation over a connection between an intermediate node and a central node can be organized in data units such as frames, packets, cells, chunks, sub-frames, etc. It should be noted that the terms "frames", "packets", "cells", "chunks", and "sub-frames" are used interchangeably herein. Henceforth, the description of the present invention may use the term 'frame' as a representative term for any of the above group. Each frame can have a header and a payload.

A common way to satisfy the users' needs in a communication system, as well as the capacity of a service provider infrastructure is by offering different types of services with different levels of quality of service (QoS). For example, real time communication telephone session over a cellular network may have the highest level of QoS. Data communication based on Internet Protocol (IP) can have quality of service such as "best effort", for example. Communication based on the IP protocol may have different levels of service. For example, communication based on a transport protocol such as TCP/IP may have a different level of service than communications that are based on the user datagram protocol (UDP/IP), etc.

In order to satisfy the needs of the users and the capacity of the network, bandwidth management decisions are made. Exemplary decisions can include dropping certain types of communications, increasing latency of other types of communications, etc. However, it should be appreciated that if the management decision has to be taken in an intermediate node, it can be difficult to identify the type of the communication over a certain channel. For instance, the entire IP packet with its headers can be encrypted as the payload of a data frame used over the channel, or information on the type of data can be transferred over another channel, such as a signaling channel, etc.

Therefore, there is a need in the art for a system and method for identifying the type of communication that is transferred between two intermediate nodes over a communication link that includes a plurality of different channels or sub-channels carrying encrypted data. Based on the identified type of communication or protocol, bandwidth management decisions can be taken. Such a system can improve bandwidth utilization while taking into consideration the promised level of QoS.

BRIEF SUMMARY

Exemplary embodiments of the present invention provide a novel apparatus and improved methods for identifying transport protocols of data communications that are based on IP protocols. An exemplary embodiment of the present invention can be installed over a communication link between two intermediate nodes over a plurality of channels or sub-channels. An exemplary apparatus according to the present invention can be installed in ingress of a communication link (a bearer), at the central node, an RNC for example. In this application the terms "communication line or link" and "bearer" are used interchangeably. Henceforth, the description of the present invention may use the term 'bearer' as a representative term for any of the above group.

In order to identify the type of IP data traffic (IP packets), which is carried over a certain channel of a bearer as payload of the channel frames, an embodiment of the present invention utilizes the differences in the behavior of UDP traffic versus TCP traffic to load variance over a connection between a source and a destination. Observations show that a TCP connection starts with high throughput rate (packets or bytes per second) and in response to packet loss, which reflects load over the connection, the throughput is reduced progressively. In contrast, a UDP connection starts with one throughput rate (packets per second) and may continue until suddenly the throughput is dropped, in a step function, to a lower throughput value. In other UDP sessions, the connection may stay with the same (starting) throughput rate until the end of the session.

In one embodiment of the invention, network data transmission resources are controlled based on monitored and analyzed data traffic flow. More specifically, the traffic flow of one or more communication channels that carries IP data embedded within a bearer's frames is monitored by a device that sits in the ingress of the bearer between two intermediates nodes of the network. The device operates to characterize the transport protocol being used by the IP data traffic embedded as payload of the bearer frames carried over a channel or a sub-channel of the bearer. This information either by itself, or with other information such as, but not limited to, a subscribers entitled level of service and/or the traffic load, is then used to control the resources. For instance, a policy may be used to define particular actions to take in particular circumstances. Thus, if a subscriber is entitled to a medium to low level of service (i.e., such as for a typical data connection) and it is determined that the transport protocol is TCP/IP, if the traffic load is heavy, then traffic for this particular subscriber may be held, aggregated or even dropped.

Monitoring the traffic to characterize the transport protocol, used by the payload carried over a channel is one aspect of various embodiments of the present invention. One way to implement this aspect include identifying the time between the reception of IP data packets, counting the number of IP data packets received; and keeping a running sum of the time by summing the time between IP data packet receptions. Furthermore, a recent-average-time between consecutive received IP data packets for a predefined period of time, or predefine number of received packets, can be maintained. Characteristics of the transport protocol can then be identified by comparing the recent-average-time with a current time between packets receptions. For instance, if the difference between the recent-average-time and the current time falls within a first range of values, the transport protocol may be of a first type and if the difference between the recent-average-time and the current time falls within a second range of values, then the transport protocol may be of a second type.

More specifically, as one example of this embodiment, the transport protocol may be identified as UDP when the difference of values is almost zero or quite high compare to the average. Exemplary values can be almost zero (approximately 1 to 2 percent of the recent-average-time or approximately between two times the recent-average-time and one fourth of the recent-average-time. Further, the transport protocol may be identified as TCP if the difference of values is between 3 percent of the recent-average-time and 12.5 percent of the recent-average-time.

An alternate exemplary embodiment of the present invention may monitor a current throughput over a certain connection by counting the number of bytes that are transferred over the connection (channel or sub-channel, for example) during a predefine current-period of time. Exemplary current-period of time can be in the range of few tens of milliseconds to few seconds. A recent average throughput value can be calculated for a recent predefined average-period of time. The recent average-period of time can be a few times the current-period of time. Then, a difference value between a current throughput and the recent-average-throughput can be analyzed for determining the type of the transport protocol used by the data carried over the channel.

The transport protocol may be identified as UDP when the difference value is almost zero or quite high compare to the recent-average-throughput. Exemplary almost zero values can be approximately 1 to 2 percent of the recent-average-throughput value. The quite high value can be approximately between two times the recent-average-throughput and one fourth of the recent-average-throughput. Further, the transport protocol may be identified as TCP if the difference of throughput values is between 3 percent of the recent-average-throughput and 12.5 percent of the recent-average-time, for example.

The foregoing summary is not intended to summarize each potential embodiment or every aspect, feather or application of the present disclosure, and other features and advantages of the present disclosure will become apparent upon reading the following detailed description of the embodiments with the accompanying drawings and appended claims.

Furthermore, although specific exemplary embodiments are described in detail to illustrate the inventive concepts to a person skilled in the art, such embodiments are susceptible to various modifications and alternative forms. Accordingly, the figures and written description are not intended to limit the scope of the inventive concepts in any manner.

BRIEF DESCRIPTION OF THE SEVERAL VIEWS OF THE DRAWING

Exemplary embodiments of the present invention will be understood and appreciated more fully from the following detailed description, taken in conjunction with the drawings in which.

DETAILED DESCRIPTION OF EMBODIMENTS OF THE INVENTION

Turning now to the figures in which like numerals represent like elements throughout the several views, exemplary embodiments of the present invention are described. For convenience, only some elements of the same group may be labeled with numerals. The purpose of the drawings is to describe exemplary embodiments and not for production. Therefore features shown in the figures are chosen for convenience and clarity of presentation only.

Figure 1:
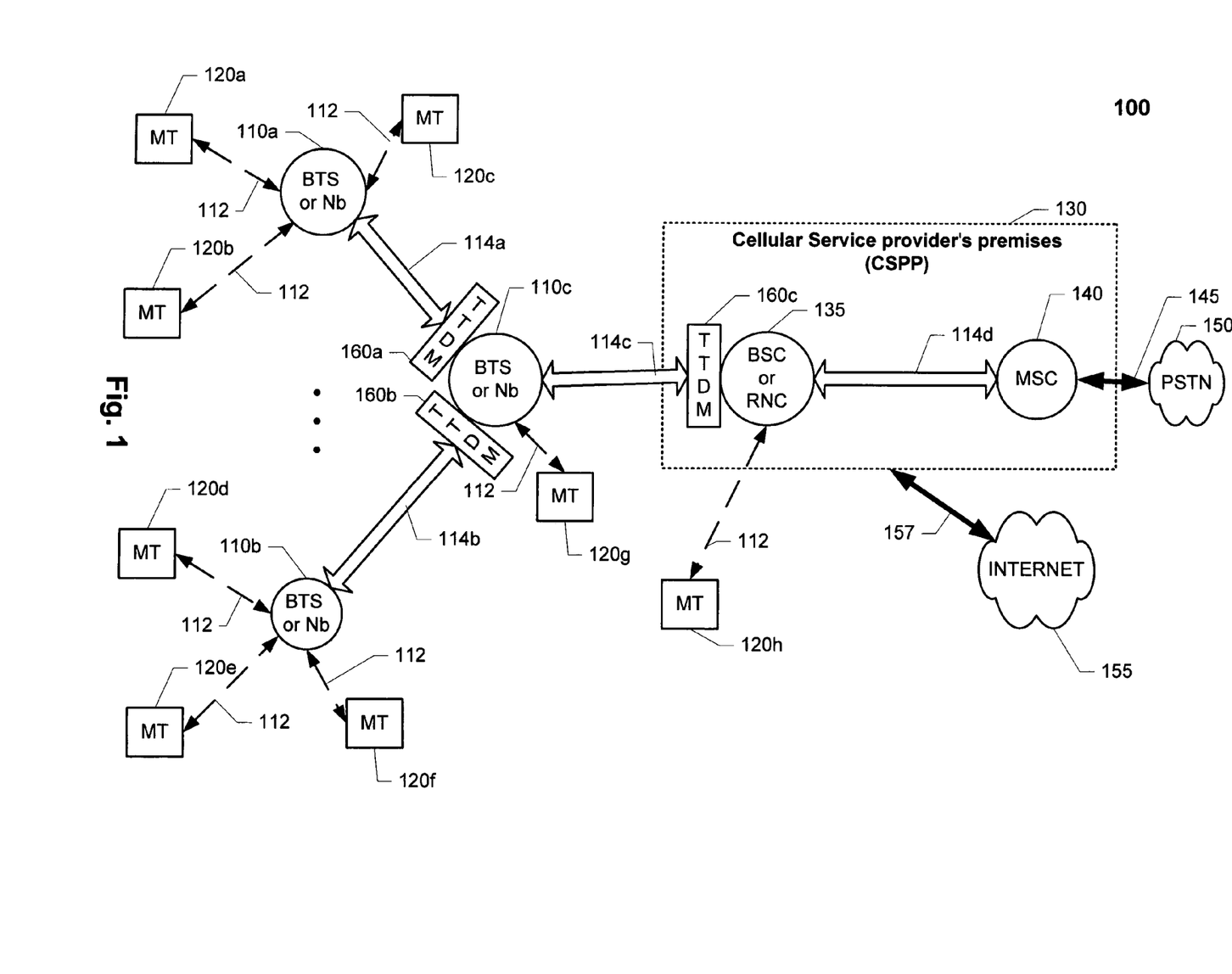
FIG. 1 is a simplified block diagram illustration of an exemplary portion of a communication network in which an exemplary embodiment of the present invention is used.

FIG. 1 illustrates a block diagram of a portion of an exemplary cellular network 100. The cellular network 100 may comprise a plurality of base transceiver stations (BTS/Nbs) 110*a-c* and a Cellular Service Provider Premises (CSPP) 130. A common BTS/Nb 110*a-c* wirelessly 112 connects mobile terminals (MT) 120*a-g* serviced by the network 100. The BTS/Nbs 110*a-c* are connected to a regional base station controller (BSC/RNC) 135, which is located at the CSPP 130, through a plurality of links 114. Links 114*a-d* may comprise cable wires (e.g. the E1 link), fiber optics, or other communication links, such as wireless omni-directional links, Microwave links, etc. The transportation over links 114*a-d* may be based on different types of communication protocols, including but not limited to ISDN, ATM, Internet Protocol (IP), etc. Exemplary MTs 120*a-h* can include a cellular phone, a PDA with cellular capabilities, or any other computerized device that can generate and/or receive audio, video, data or any combination of those via a cellular network.

At the CSPP 130, one or more BSC/RNCs 135 may be connected to a mobile switching center (MSC) 140. Among other tasks, the MSC 140 may serve as an interface between the cellular network 100 and one or more Public Switched Telephone Networks (PSTN) 150. The MSC 140 may comprise one or more codec devices at a Transcoder Rate Adapter Unit (TRAU), for example. The codec may be used to compress (encode) audio coming from a regular telephone via the PSTN 150 and connection 145 and targeted to one of the MTs 120*a-h* that are connected over network 100. The codec at the MSC 140 may be used as an initiator of a compressed audio or as a receiving entity (destination) for a compressed audio depending on the direction of the transportation. There are some embodiments in which a BSC/RNC 135 may have some of the functionality of the MSC 140. In addition, the CSPP 130 may be connected to the Internet 155 via connection 157. At the CSPP 130 the IP transportation toward or from an MT 120 is processed by different modules, such as but not limited to, SGSN, GGSN, etc. which are not shown in the drawings.

Within the context of this description, the BTS and/or Nb can be referred to as a cell. There are locations or regions in which a cellular service provider may simultaneously serve or support two or more types of cellular networks (i.e., 1G and/or 2G and/or 3G). When this occurs, one or more communication links 114*a-c* may carry the transportation of the two or more cellular networks. For example, suppose that cell 110*a* is a BTS and cell 110*b* is an Nb. In this example, the communication link 114*c* would be required to carry or support 2G transportation to/from BTS/NB 110*a* and 3G transportation to/from Nb 110*b*. In addition, a site that has a BTS and an Nb in the same location may exist. In such a case, transportation of 2G and 3G may converge into a communication link 114.

Each link 114*a-c* may comprise one or more tunnels, which are formed of a plurality of channels. In 3G networks, the communication between the RNC 135 and the different Nbs 110*a-c*, over the communication links 114, may be encrypted. A common BSC or RNC 135 may also communicate directly with one or more MTs 120*h* that are located in an area (cell) served by that BSC/RNC or RNC 135.

When an MT 120 participates in a telephone call, the BSC/RNC 135 may allocate a connection from the BSC/RNC 135 to the BTS/Nb 110*a-c* servicing the MT 120. The allocated connection is formed as a dedicated channel or subchannel, which is used only for transferring information to and from the MT 120 to which the connection was allocated. The transferred information can be embedded as a payload of frames that are used over the allocated channel. The allocation remains in effect until the telephone call is terminated. During the call, the MT 120 converts input audio/video signals into digital signals. As the use of wireless bandwidth is very costly, the digital signals are compressed (encoded) by the MT 120, and the compressed signals are transmitted to the servicing BTS/Nb. Generally, the compressed digital signals are organized in frames with each frame comprising a header and a compressed payload.

The servicing BTS or Nbs (cell) 110*a-c* transfers the compressed signals as they are, without decompressing them, to the BSC or RNC 135, over bearers 114 and from there to MSC 140. On the other direction, download transportation (audio and/or video and or computer data) from CSPP 130 to a MT 120 may be received via PSTN 150 or Internet 155 or from any other MT 120*a-h*. The received transportation is processed by MSC 140 and BSC or RNC 135 and may be sent toward the targeted MT 120 via one or more bearers 140*a-c* and one or more cells 110*a-c*. More information on cellular network technology and operation can be found in relevant web sites such as www.etsi.org or www.3gpp.org. The content of which are incorporated herein by reference and are considered as known to those skilled in the art although elements can be combined with the various aspects, features and embodiments of the present invention in a novel manner.

IP data transportation directed to or from an MT 120 may be received from the Internet 155 over communication link 157. The IP packets can be processed by an SGSN and or GGSN (not shown in the drawings), for example, and be transferred toward the BSC or RNC 135. The IP data packets can be embedded within frames or sub-frames that are used over the bearers. The data frames carrying the IP data packets can be sent toward the appropriate MT 120 over an appropriate bearer 114 in an allocated channel for the IP data connection.

A cellular service provider has been presented as an exemplary communication service provider. However, the present invention is not limited to cellular service provider. It can be implemented in a network of an Internet service provider (ISP) for example.

A common method to control the load over an exemplary network is by implementing aggregation decisions. Usually, an aggregation decision is based on the level of service to which a user is entitled. The level of service depends on the type of transportation that is used. Therefore a throughput type detector module (TTDM) 160*a-c* is added in a junction between a base station and a bearer. For example, TTDM 160*c* is added in the junction of BSC/RNC 135 and bearer 114*c*; TTDM 160*a* is added in the junction of BTS/Nb 110*c* and bearer 114*a*; and TTDM 160*b* is added in the junction of BTS/Nb 110*c* and bearer 114*b*. An exemplary cellular service provider may install a TTDM inside the CSPP 130 (not shown in the drawings) at the egress of the SGSN in front of a bearer carrying the IP data traffic toward a BSC or RNC 135.

Each TTDM 160*a-c* can be capable of receiving download transportation, targeted toward its associated bearer 114*a-c*; and processing the received transportation in order to identify the type of the transport protocol used by an IP data packet that is carried as the payload of the bearer frames and sent toward one of the MTs 120*a-g*. The type of the IP transport protocol can be used for determining the appropriate level of service to which the targeted MT 120*a-g* is entitled. According to the type and the level of service, an exemplary TTDM 120*a-g* can control the load over the associated bearer 114 by aggregating, dropping or transferring the received transportation over the connection, for example.

Exemplary TTDM 160 may communicate with each other and with CSPP 130. The communication can include, for example, information regarding the current load over a certain path, or about the type of the communication that has been identified over a certain path. Such information can improve the efficiency of each TTDM. Policy information and subscriber related data can be communicated from CSPP 130 to each one of the TTDM 160*a-c*. The communication can be done over a status and control line (not shown in the drawing). In some embodiments of the present invention the status and control connection can be out of band, for example over an IP network. In other embodiments of the present invention the status and control line can be embedded within an associated bearer 114. More information on the operation and the construction of an exemplary TTDM 160*a-c* is disclosed below in conjunction to FIGS. 2 & 3*a-b*.

Figure 2:
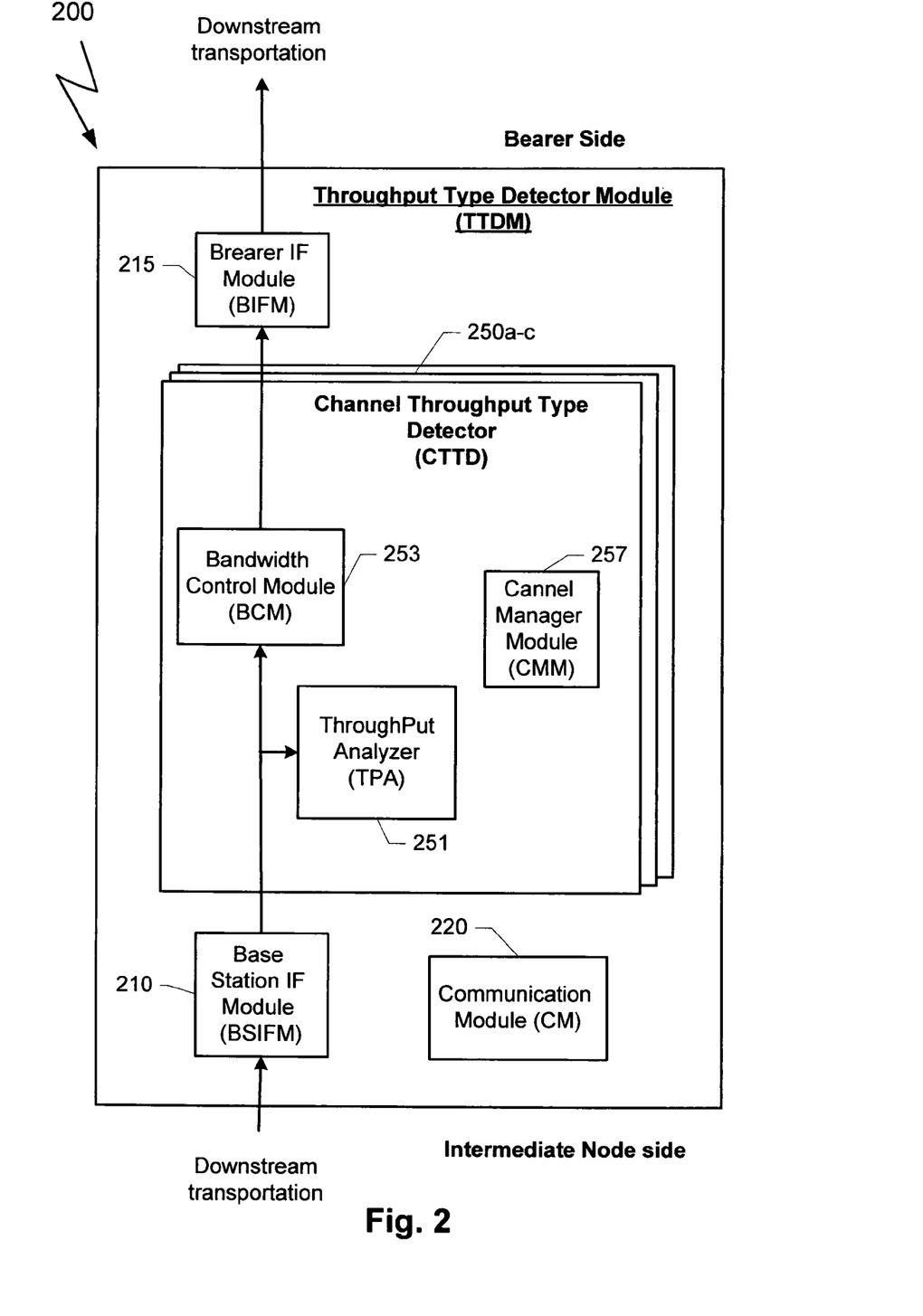
FIG. 2 schematically illustrates a block diagram with relevant elements of an exemplary Throughput Type Detector Module (TTDM) that operates according to certain teachings of the present disclosure.

FIG. 2 illustrates a block diagram with relevant elements of an exemplary embodiment of a throughput type detector module (TTDM) 200 that operates according to certain teachings of the present disclosure. The exemplary TTDM 200 that is illustrated in FIG. 2 can be installed in a junction between a cell 110*c* or 135 and an associated bearer 114*a-c* (FIG. 1), for example units 160*a*, 160*b* and 160*c* (FIG. 1). In one exemplary embodiment, the TTDM 200 may intercept the communication between the network layer and the link layer or the physical layer of the connection between its associated cell 110/135 and its associated bearer 114*a-c*; and process the received data for identifying the type of the transport protocol used in an IP communication session that is transferred as payload over a channel or sub-channel of the bearer 114*a-c*. The type of transport protocol can be used for managing the bandwidth consumption over the associated connection according to the subscriber contract.

The exemplary TTDM 200 can analyze the changes in the throughput over a connection carrying an IP communication session. If the changes are small changes, such as changes of a few percent of the average throughput over the connection, then TTDM 200 can assume that the transport protocol that is used over the connection is TCP/IP. If the changes are almost zero and suddenly it drops in few tens of percentages or the throughput remains without changes for the entire inspecting period, than it can be assumed, with high probability, that the transport protocol used over the connection is UDP/IP. TCP/IP stands for transmission control protocol and UDP/IP stands for user datagram protocol.

An exemplary TTDM 200 may comprise a base station interface module (BSIFM) 210, a bearer interface module (BIFM) 215, a communication module 220, and at least one channel throughput type detector (CTTD) 250*a-c*. Each CTTD 250*a-c* can include a bandwidth control module (BCM) 253, a throughput analyzer module (TPA) 251 and a channel manager module (CMM) 257.

BSIFM 210 gets the downstream transportation that is transferred from its associated cell 110*c* or 135 (FIG. 1) to the associated bearer 114*a-c*. The BSIFM 210 receives frames (packet, cells, data chunks, sub-frames, etc,); and processes the received frames according to the network communication protocol that is used over the communication link 114. A common frame may include one or more envelopes and a core (payload). The envelope can also be referred to as a header. Processing the received frame/sub-frame may comprise parsing only the header of the frame and the external envelope (if there is more than one envelope).

The BSIFM 210 may initially determine whether the frame carried IP data. Frames that do not carry IP data can be transferred via BIFM 215 toward the bearer at the output TTDM 200. In one exemplary embodiment of the present invention that is connected to an ATM bearer the Vp and Vc fields of the ATM header are be parsed. The Vp and Vc fields can reflect the QoS that is associated with the connection. Low QoS such as "best effort", level 3 or level 4 of QoS, for example, indicates that the data carried as payload of the connection is IP data. In some embodiments of the present invention the bearer that is associated with TTDM 200 carries only payload of IP data. Yet in other embodiments the bearer itself that is associated with TTDM 200 complies with Internet protocol.

When a received frame carries an IP payload, the BSIF may determine whether the received information belongs to a new connection. This decision may be based on the connection ID that is associated with the frame and the information in a connection table. The connection ID can be one of a variety of information items including a multi-channel time slot number, a single time slot number for a TDM frame, an address for an ATM network, an IP address, a connection ID number (CID), etc. The connection table can include a plurality of entries. Each entry in the connection table can be associated with a certain connection (channel or sub-channel) ID. In addition, each entry in the connection table can include a plurality of fields for information such as the connection ID, the associated CTTD 250*a-c*, the detected type of transport protocol used by the payload of the frame, etc. The connection table can be managed by the BSIFM 210 and can be accessed and shared by the different modules of TTDM 200.

If the BSIFM 210 determines that an entry associated with the connection ID exists in the connection table, then the entry is parsed for determining which CTTD 250*a-c* is associated with the connection. Upon making this determination, the received frame is transferred to the associated CTTD 250*a-c*.

If an entry does not exist in the connection table for the particular connection ID, then this implies that the newly received frame is associated with a new connection. In this situation, the BSIFM 210 may create a new entry in the connection table to be associated with the new connection. In addition, a new CTTD 250*a-c* may be created and associated with the new entry in the connection table. The new CTTD 250*a-c* will manage the throughput over the new connection.

The BIFM 215 may receive frames from the one or more CTTDs 250*a-c*, and in response, process the frames according to the protocol used over the physical layer of the associated bearer 114. The processed frames are sent toward the associated MT 120*a-c* via the associated bearer 114*a-c* (FIG. 1) and an appropriate cell 110*a-c* (FIG. 1) on the other side of the bearer.

The CM 220 is the communication interface module between the TTDM 200 and the different modules of the CSPP 130 (FIG. 1) or the other TTDMs 160*a-c*. The communication via the CM 220 includes control, signaling and status signals but does not include cellular transportation. The CM 220 may also include bandwidth management policies. An exemplary policy may define the relationship between a subscriber's contract, type, of transportation and load over the network. As a non-limiting example, the recommendation of a policy in a certain load condition for a certain user's traffic can be: drop, delay, or transfer. Other types of communication can be the current load over a certain path, etc. The communication through the CM 220 may be conducted over an IP network, such as but not limited to a LAN, WAN, Internet, etc. In some embodiments, the communication can be performed either in band or out band. The communication can be carried via the signaling link not shown in the drawings or over bearers 114*a-c* depending on the particular embodiment or even upon operational factors.

An exemplary CTTD 250*a-c* can be created by a BSIFM 210 upon receiving a frame-carried payload of IP communication session that belongs to a new connection. Once a CTTD is created, it typically will exist as long as the connection is active. When the connection becomes inactive, the resources of the relevant CTTD 250*a-c* can be released as well as the associated entry in the connection table. In an alternate embodiment of the present invention, a TTDM 200 may include a bank of CTTDs 250*a-c*. In such embodiments, when a packet from a new connection is received and identified, the relevant BSIFM 210 may search for a free CTTD and assign it to the new connection.

Each particular CTTD 250*a-c* can operate to identify the type of the transport protocol used by the payload carried over the associated channel/sub-channel and accordingly, it can manage the bandwidth over the connection according to policies used by the service provider. Managing the bandwidth can be implemented by dropping packets, aggregating (delaying) packets, transferring the packet as is, etc.

When a CTTD 250*a-c* associated with a connection receives a new frame from the BSIFM 210, a trigger is delivered to the TPA 251 and the frame is stored at the BCM 253. The BCM 253 can handle the frames transportation over the channel according to decisions made by the CMM 253. Few options can be available, such as but not limited, to dropping the frames; transferring the frames without delay toward the BIFM 215, or aggregating the frames, by storing the frames in a buffer. The buffer can be a random access memory (RAM) or a first in first out (FIFO), for example.

An exemplary TPA 251 can analyze the throughput and the behavior of the changes in the throughput over the connection in a variety of manners. For instance, the TPA 251 can count the received triggers, one per each packet, to identify traffic volume. Alternatively, or additionally, an exemplary TPA 251 can count the number of bytes, which are received during a certain predefined period of time. Yet, another embodiment may include implementing more than one method for measuring the throughput. For example, such an embodiment may count the number of received bytes in consecutive predefined periods of time and in parallel, it may measure the time interval between consecutively received frames. The result of the analysis is used for defining the type of the traffic: UDP traffic, TCP traffic or other types of traffic. The TPA 251 can be capable of tracking the throughput over the channel. If the connection starts with a high level of throughput and the throughput is subsequently reduced progressively and stays around a certain value with only small changes or fluctuations, then the TPA 251 can determine that the traffic is TCP traffic. If the connection starts with a high level of throughput and continues at that level until suddenly dropping, in a step-like function, to a lower level of throughput and staying at that level for a long period of time without further changes, then the TPA 251 can determine that the traffic is UDP traffic. If the throughput behaves in other patterns, then TPA 251 can determine that the traffic is of another type (unknown). More information on the operation of the TPA 251 is disclosed below in conjunction with FIGS. 3A and 3B.

The decision of the TPA 251 is transferred to the CMM 257. The CMM 257 may receive via the CM 220, information related to the subscriber presently communicating over the connection. Such information may include his contract and the entitled level of service. In addition information pertaining to the load over the connection is received. According to the load, the policy related to the subscriber, and the type of traffic (TCP, UDP or others), a decision is made with regards to how to handle the traffic: drop, delay or transfer as is, etc. The decision is transferred to the BCM 253 to be executed.

Figure 3A:
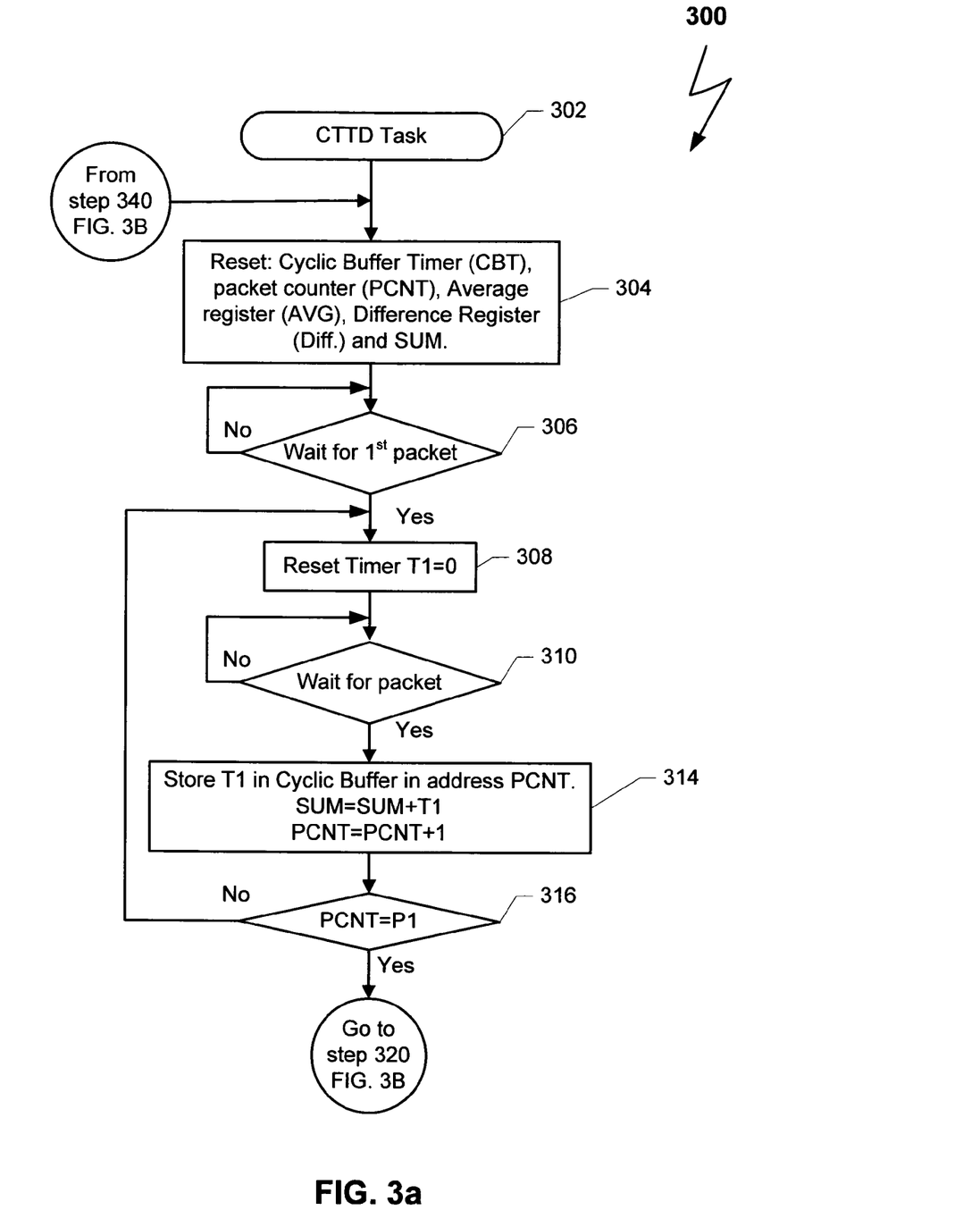
FIGS. 3A and 3B schematically illustrates a flowchart showing relevant processes of an exemplary embodiment of a method for identifying transport protocol of an IP communication carried as payload over a channel/sub-channel.

FIG. 3A is a flow diagram illustrating processes 300. The process 300 can be executed by an exemplary CTTD 250*a-c* (FIG. 2) for detecting the type of IP transport protocol that is currently used over its associated channel in bearer 114 (FIG. 1). The process 300, which includes a detecting task, may use one or more methods for detecting the transportation over bearer 114. The task 300 can be executed as a standalone process or in addition to, or instead of, one of other available inspection methods. Exemplary task 300 may be initiated 302 by the BSIFM 210 (FIG. 2) when a new connection that carries IP payload is established over bearer 114 (FIG. 1), as is described above.

After initiation 304, resources are allocated and reset. Resources such as cyclic buffer timer (CBT); packet counter (PCNT); average register (AVG); difference register (DIFF), a sum register (SUM), etc. In addition, a cyclic buffer is allocated for storing a predefined number, 'P1', of time intervals between consecutive IP packets. 'P1' can be in the range of few packets to a few tens of packets, for example. For simplifying the process, exemplary values of P1 can be power of 2, such as but not limited to 4, 8, 16, etc. The CBT can be used to measure the time from the initiation of the process. After initiation, the process 300 can wait 306 for the reception of the first packet.

Figure 3B:
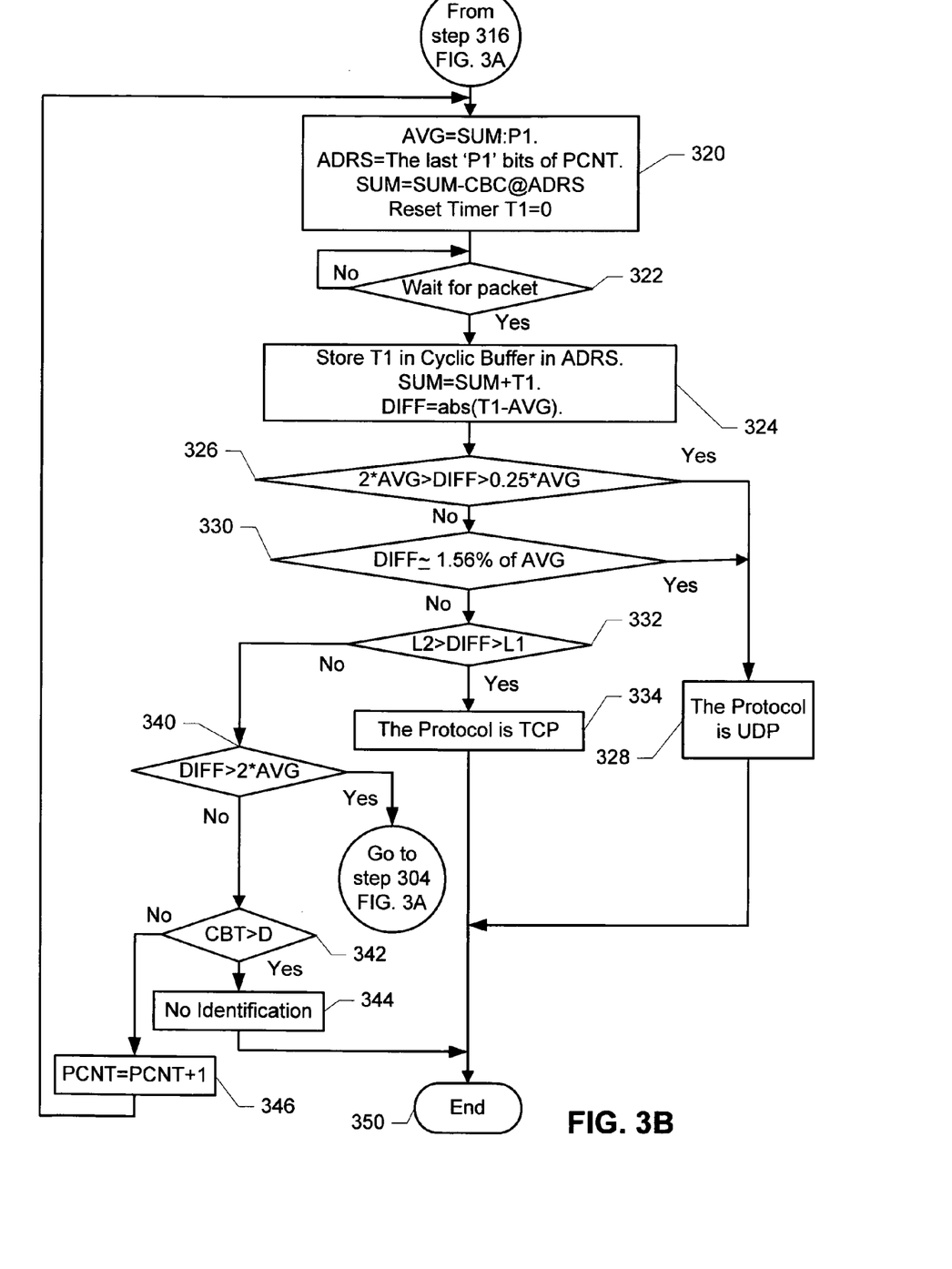

Upon receiving the first packet, the process 300 starts a second section of the task 300, which includes steps 308 to 316. In the second section of task 300, information that is needed for calculating the rate of the connection is collected. Upon receiving the first packet, a timer T1 is initiated 308 (i.e. is set to zero) and the process 300 waits 310 for the next packet. When the next packet is received 310, the value of timer T1 (the time interval between the two consecutive packets, is written 314 in the cyclic buffer at an address which is equal to the value of PCNT. Then the value of T1 is added to the value of SUM and the result is stored in SUM and the PCNT is incremented by one. After the calculation, a decision is made 316 whether the value of PCNT is bigger than the value of 'P1'. If PCNT is less than P1, the process 300 returns to step 308 for collecting additional information. If PCNT is equal to P1 316, the process 300 proceeds to the third section, which is illustrated in FIG. 3B. During the third section, the process 300 follows the rate of the connection for monitoring the changes in the rate in order to determine the type of the transportation protocol.

At step 320, a recent-average-time is calculated as an average value of the time intervals stored in the cyclic buffer. The recent-average-time is calculated by dividing the value of SUM with the value of P1. The result is stored in the AVG register. The last 'P1' bits (4, 8, 16 . . . ) of PCNT are stored in the address register ADRS. The content (the time interval) stored in the cyclic buffer in address ADRS (CBC@ADRS) is subtracted from of the value of SUM and the result is stored in SUM. The value of the content stored in the cyclic buffer in address ADRS is executed in order to update the value of SUM to accept the new time interval that will be stored in the cyclic buffer in location ADRS. Using such a method can produce a recent-average-time value that matches the recently received P1 packets. Finally timer T1 is reset and the process 300 waits 322 for the next packet.

Upon receiving 322 the next packet, the value of timer T1 is stored 324 in the cyclic buffer at address that is equal to the value of ADRS. Then the Value of T1 is added to the value of SUM and the result is stored in SUM. The value, which is stored in AVG register, is subtracted from the value of T1 and the absolute value of the result is stored in DIFF register. The absolute value of DIFF represents the distance of the current time interval (T1) from the stored recent-average-time interval.

At this point, the value of DIFF is examined to determine 326, whether the value of DIFF is smaller than a value that represents packet loss. For example, if the DIFF is less than two times the AVG value but is larger than a large portion of the value of AVG, 25% for example, then it is determined 328 that UDP is the transport protocol. However, if these conditions are not met 326, the process 300 proceeds to step 330 to determine whether the difference (DIFF) is a small value (near zero) or around 1.56% of the AVG value, for example. It should be appreciated that the value of 1.56% is just a non-limiting example and a range of values could be used such as between 1% and 2% and, in some situations the range may even be larger and as such, the present invention is not limited to a particular set of values. Rather, the invention simply detects that the value of DIFF is a small value. If the DIFF is a small value 330, then it is determined that UDP is the transport protocol 328. This decision is then transferred to the CCMM 257 (FIG. 2) and process 300 is terminated 350.

On the other hand, if the value of DIFF does not satisfy the conditions of decision block 326 or decision block 330, then it is determined 332 whether the value of DIFF is in between certain limits L1 and L2. Exemplary values for L1 can be 3.125% of AVG and L2 can be 12.5% of AVG. If the value of DIFF meets these conditions 332, it is determined 334 that the TCP is transport protocol. This decision is then communicated to the CMM 257 and the process 300 is terminated 350.

However, if the conditions in decision block 332 are not satisfied by the value of DIFF (i.e., DIFF is not in between L1 and L2), then it is determined whether 340 DIFF is bigger than a value that represents the time interval of the lost one or more packets, for example two times the AVG value. If DIFF is larger than this value 340, the process 300 assumes that some packets have been lost or a new connection was established. In such a situation, the process 300 can return to step 304 (FIG. 3A) and starts from the beginning. If 340 DIFF is not bigger than two times the value of AVG, then is it determined 342 whether the value of timer CBT is larger than 'D'. 'D' can be few milliseconds to a few seconds. If the value of timer CBT is larger than D 342, then the process 300 determines 344 that it cannot identify the transport protocol. In such a situation, the transport protocol may be the datagram congestion control protocol (DCCP), the stream control transmission protocol (SCTP) or some other proprietary, new or modified protocol. This decision is transferred toward the CMM 257 (FIG. 2) and process 300 terminates 350.

However, if 342 the value of CBT is not larger than 'D', then the value of PCNT is incremented by one 346 and the process 300 returns to step 320 to continue tracking the rate of the connection.

Another exemplary embodiment of the present invention may use an alternate method for tracking changes in the throughput over a channel or sub-channel. Such an embodiment may count the number of bytes (NoB) that have been received during consecutive predefine time intervals (PDTI) and analyze the changes in the number of received bytes. An exemplary PDTI can be between hundreds of milliseconds to a few seconds (the period can be a function of the type of the connection), for example. The process 300 which is illustrated in FIGS. 3A and 3B and are disclosed above can be slightly modified in order to fit the alternate option. For example, the modified method can implement a similar cyclic buffer as process 300. However, each entry in the cyclic buffer will be associated with a PDTI and the content of each entry will be the NoBs that have been received during the relevant PDTI. In the modified process 300, the values of NoB can replace the time interval T1, which is used by original process 300.

The counter PCNT that measures the number of packets in FIGS. 3A and 3B will be modified to measure the number of PDTI that have been passed from the beginning of the analysis. P1 that represents the number of entries in the cyclic buffer can be a similar value to the one that is used by method 300. AVG can represent an average value of the NoBs that have been received during the periods of the last consecutive P1 of PDTI.

Decision nodes 326, 332 340 can be modified in order to match the criteria of NoBs instead of time intervals between consecutive packets. An exemplary modified formula of decision node 326 can be: 0.9375*AVG>DIFF>0.25*AVG. An exemplary modified formula of decision node 332 can be: 0.1250*AVG>DIFF>0.03125*AVG. An exemplary modified formula of decision node 340 can be: DIFF<0.0625*AVG. In the modified process 300, the values of DIFF and AVG are the number of bytes per the predefined period of time. Yet another alternate embodiment of the present invention may implement both methods in parallel for determining the behavior of changes in the throughput of the associated channel.

In the description and claims of the present application, each of the verbs, "comprise", "include" and "have", and conjugates thereof, are used to indicate that the object or objects of the verb are not necessarily a complete listing of members, components, elements, or parts of the subject or subjects of the verb.

In this application the words "unit" and "module" are used interchangeably. Anything designated as a unit or module may be a stand-alone unit or a specialized module. A unit or a module may be modular or have modular aspects allowing it to be easily removed and replaced with another similar unit or module. Each unit or module may be any one of, or any combination of, software, hardware, and/or firmware. Software of a logical module can be embodied on a computer readable medium such as a read/write hard disc, CDROM, Flash memory, ROM, etc. In order to execute a certain task a software program can be loaded to an appropriate processor as needed.

The present invention has been described using detailed descriptions of embodiments thereof that are provided by way of example and are not intended to limit the scope of the invention. The described embodiments comprise different features, not all of which are required in all embodiments of the invention. Some embodiments of the present invention utilize only some of the features or possible combinations of the features. Variations of embodiments of the present invention that are described and embodiments of the present invention comprising different combinations of features noted in the described embodiments will occur to persons of the art.

It will be appreciated by persons skilled in the art that the present invention is not limited by what has been particularly shown and described herein above. Rather the scope of the invention is defined by the claims that follow.

What is claimed is:

1. A method for identifying the type of transport protocol of an IP communication session carried as a payload over a bearer between two intermediate nodes and providing control of network data transmission resources based on such identification, wherein the data traffic in the bearer is carried over a plurality of channels, the method comprising the steps of:
   intercepting the data traffic in a communication channel between the two intermediate nodes:
   monitoring one or more characteristics of the traffic for the communication channel by:
      monitoring the time between receptions of consecutive packets of the IP communication session;
      calculating a recent-average-time between consecutive IP packets for a group of recently received IP packets; and
      identifying a current time between a current received IP packet and a previously received IP packet; and
      comparing the recent-average-time with the current time;
   identifying the transport protocol used by an IP communication session, which is carried as payload over the communication channel, based on the traffic characteristics of the communication channel over time;

if the difference between the recent-average-time and the current time falls within a first range of values, concluding that the transport protocol that is used by the IP session is of a first type; and if the difference between the recent-average-time and the current time falls within a second range of values, concluding that the transport protocol is of a second type.

2. The method of claim 1, further comprising the steps of:
identifying a level of service entitled to the current user of the communication channel; and
employing a policy to control utilization of the network data transmission resources based on the IP transport protocol used by the communication session and the entitled level of service.

3. The method of claim 1, wherein the step of identifying the transport protocol used by an IP communication session, which is carried as payload further comprises making such identification when the payload of the channel is encrypted.

4. The method of claim 1, wherein the first range of values is approximately between two times the recent-average-time and one fourth of the recent-average-time or approximately 1 to 2 percent of the recent-average-time and, the step of concluding that the transport protocol is of a first type further comprises concluding that the transport protocol is UDP.

5. The method of claim 1, wherein the second range of values is approximately between 3 percent of the recent-average-time and 12.5 percent of the recent-average-time and, the step of concluding that the transport protocol is of a second type further comprises concluding that the transport protocol is TCP.

6. The method of claim 1, wherein the step of characterizing the transport protocol further comprises the steps of:
if the difference between the recent-average-time and the current time changes in a significant step, then concluding that the transport protocol is UDP; and
if the difference between the recent-average-time and the current time changes progressively over time, then concluding that the transport protocol is TCP.

7. The method of claim 6, wherein the step of employing a policy to control allocation of the network data transmission resources based on the transport protocol and the entitled level of service, further comprises aggregating, dropping or transferring the received transport based on the identified transport protocol and entitled level of service.

8. The method of claim 7, further comprising dropping a received transport if the entitled level of service is on the low end thereby freeing up resources for transport entitled to a higher level of service.

9. A method for identifying the type of transport protocol of an IP communication session carried as a payload over a bearer between two intermediate nodes and providing control of network data transmission resources based on such identification, wherein the data traffic in the bearer is carried over a plurality of channels, the method comprising the steps of:
intercepting the data traffic In a communication channel between the two intermediate nodes:
monitoring one or more characteristics of the traffic for the communication channel by:
calculating a current throughput value by counting the number of bytes that are carried as payload over the channel for a first period of time;
calculating a recent-average-throughput value for a group of recent first periods of time; and
comparing the recent-average-throughput with the current throughput value;
identifying the transport protocol used by an IP communication session, which is carried as payload over the communication channel, based on the traffic characteristics of the communication channel over time and,
if the difference between the recent-average-throughput and the current throughput changes in a significant step, then concluding that the IP transport is UDP; and
if the difference between the recent-average-throughput and the current throughput changes progressively over time, then concluding that the transport is TCP.

10. An apparatus that resides between two intermediates nodes in a telecommunications network and operates to identify types of transport protocol of IP communication sessions carried as payload over a bearer between the two intermediate nodes and provides control of network resources, wherein the data traffic in the bearer is carried over a plurality of communication channels, the system comprising:
a bearer interface module;
a first intermediate node interface module that intercepts the data traffic received from the first intermediate node;
a throughput analyzer that receives, from the first intermediate node interface module, data of an IP communication session carried over a communication channel, monitors the traffic characteristics for the communication channel and identifies the transport protocol used by the IP communication session based on the traffic characteristics of the communication channel over time; and
a channel manager operative to receive load information for the communication channel and the policy to control allocation of the network data transmission resources comprising the transport protocol, the entitled level of service and the load information,
wherein the throughput analyzer is operative to characterize the transport protocol by establishing a recent average value for the throughput over the communication channel and detecting if a current throughput value relative to the recent average value falls into one of the two following categories:
significantly reduces in a step, or
progressively reduces over time with small fluctuations.

11. The apparatus of claim 10, further comprising:
a bandwidth control module; and
a channel manager that is operative to:
receive a transport protocol identification from the throughput analyzer;
identify a level of service entitled to the current user of the communication channel; and
employ a policy to control allocation of the network data transmission resources by dropping the frames, transferring the frames without delay toward the bearer interface or aggregating the frames by storing the frames in the bandwidth control module.

12. The apparatus of claim 11, wherein the information related to the subscriber comprises a contracted level of service.

13. The apparatus of claim 10, further comprising a communication module, the communication module being operative to provide information related to a subscriber associated with the communication channel to the channel manager.

* * * * *